G. A. WEDEKIND & H. P. R. L. POERSCKE.
BATTERY ELECTRODE.
APPLICATION FILED JUNE 19, 1905.
937,730.
Patented Oct. 19, 1909.
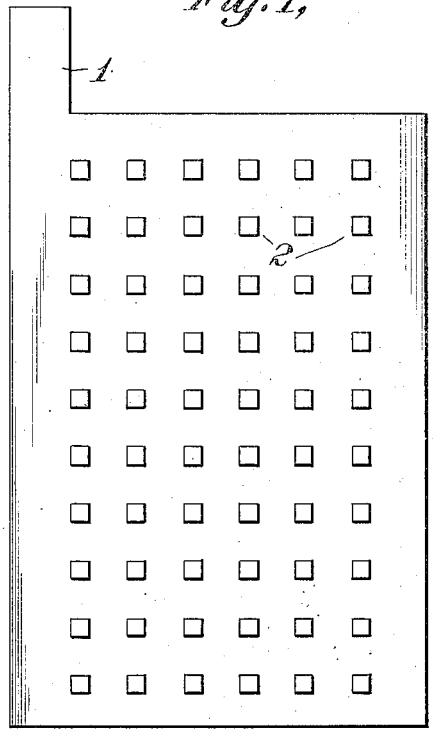
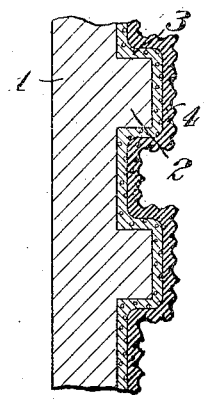

UNITED STATES PATENT OFFICE.

GUSTAV A. WEDEKIND AND HEINRICH P. R. L. POERSCKE, OF HAMBURG, GERMANY; SAID POERSCKE ASSIGNOR TO SAID WEDEKIND.

BATTERY-ELECTRODE.

937,730.         Specification of Letters Patent.         Patented Oct. 19, 1909.

Application filed June 19, 1905. Serial No. 265,833.

*To all whom it may concern:*

Be it known that we, GUSTAV A. WEDEKIND and HEINRICH P. R. L. POERSCKE, subjects of the German Emperor, and residents of Hamburg, Germany, have invented certain new and useful Improvements in Battery-Electrodes, of which the following is a specification, taken in connection with the accompanying drawings, which form a part of the same.

This invention relates to electrodes for alkaline primary or secondary batteries and to the method of producing the same; which may comprise the electro-deposition of a thick rough granular metal coating on the electrode support and the conversion of the desired portions of this coating by electrolysis or other action into suitable adherent active material.

The electrode support may be of any desired form and material to correspond to the particular circumstances under which it is used. The support may be of metal such as a plate or bar provided with ribs, lugs or projections, of sheet metal, smooth, corrugated or perforated or a metallic network, or the support may consist of a plate, rod or cylinder of carbon or other material. The support may be placed in a suitable acid, neutral or alkaline electrolyte in connection with a coöperating anode and electric current allowed to pass to deposit electrolytically on the support a rather thick, heavy metal coating of a somewhat rough, granular or cellular nature.

The electro-plated supports, preferably after being removed from the bath cleaned and washed, may be subjected to a formation process to render their surfaces active. This may be done by assembling the supports into elements in a suitable electrolyte and passing an electric current through them, so as to transform enough of the electrolytic metallic coating on the anode supports into oxids having a more or less high degree or condition of oxidation, so that a surface or facing is formed of an adherent coating of active material. By reversing the direction of the current the other electrodes may be formed by transforming the desired amount of electro-coating into active material in a similar way. Similar coöperating electrodes may be assembled in final position into cells with the proper alkaline electrolytes and after formation may be at once employed as secondary batteries; or, if desired, the electro-plated supports may be formed or provided with active material or oxids of the desired degree by electrolysis or by heating in the presence of oxygen or by other chemical action, and then, preferably after washing and cleaning, may be assembled into the complete elements for final use in primary or secondary batteries.

In the accompanying drawings, Figure 1 is an elevation showing an embodiment of this invention and Fig. 2 is an enlarged transverse sectional view of the same.

In the illustrated embodiment of this invention the support 1 is of metal, such for instance as iron, and may be provided with suitable lugs or projections 2 by casting or otherwise. Upon this support the thick coating 3, of copper or other suitable metal may be deposited electrically as described, the rate of deposition being sufficiently rapid to produce a rough granular or cellular though adherent coating having good electrical contact with the support and being of such character as to be readily converted into active material. The active or oxid material 4 may be subsequently formed to the desired extent by the conversion of the desired proportion of this electrolytic coating by heating in the presence of oxygen or by electrolytic action as described and either with or without the addition and subsequent adhesion of other active or oxid material to the electroplated support such as the addition of a suitable metallic oxid.

Having now disclosed this invention by describing an illustrative embodiment or example thereof to the details of which we do not however desire to be limited, what we claim as new and what we desire to secure by Letters Patent is set forth in the appended claim.

A battery electrode comprising a substantially rigid support provided with projecting lugs on the face thereof, a layer of electrolytically deposited spongy copper permanently secured to said face and held in position by said lugs, and electrolytically formed copper oxid overlying said spongy copper and intimately secured thereto.

GUSTAV A. WEDEKIND.
              HEINRICH P. R. L. POERSCKE.

Witnesses:
   ERNEST H. L. MUMMENHOFF,
   IDA CHRIST. HAFERMANN.